US009438609B2

(12) United States Patent
Bengochea et al.

(10) Patent No.: US 9,438,609 B2
(45) Date of Patent: Sep. 6, 2016

(54) DEVICE VERIFICATION PRIOR TO REGISTRATION

(71) Applicant: Microsoft Technology Licensing, LLC, Redmond, WA (US)

(72) Inventors: Sebastian Bengochea, Sammamish, WA (US); Vinod Shanbhag, Redmond, WA (US); Juan Diego Ferré, Seattle, WA (US); Elio Damaggio, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/472,916

(22) Filed: Aug. 29, 2014

(65) Prior Publication Data

US 2016/0065593 A1    Mar. 3, 2016

(51) Int. Cl.
| | |
|---|---|
| *G06F 21/00* | (2013.01) |
| *H04L 29/06* | (2006.01) |
| *H04L 29/08* | (2006.01) |
| *H04L 12/58* | (2006.01) |
| *G06F 9/54* | (2006.01) |

(52) U.S. Cl.
CPC ............. *H04L 63/126* (2013.01); *G06F 9/542* (2013.01); *H04L 12/587* (2013.01); *H04L 51/24* (2013.01); *H04L 63/08* (2013.01); *H04L 65/1073* (2013.01); *H04L 67/24* (2013.01); *H04L 67/26* (2013.01)

(58) Field of Classification Search
CPC combination set(s) only.
See application file for complete search history.

(56) References Cited

U.S. PATENT DOCUMENTS

| | | | |
|---|---|---|---|
| 8,634,810 B2 | 1/2014 | Barkie et al. | |
| 2011/0173681 A1 | 7/2011 | Qureshi et al. | |
| 2011/0252238 A1* | 10/2011 | Abuan ................ | H04L 61/2575 713/168 |
| 2013/0269020 A1 | 10/2013 | Griffin et al. | |
| 2014/0007213 A1 | 1/2014 | Sanin et al. | |
| 2014/0020073 A1 | 1/2014 | Ronda et al. | |
| 2014/0220933 A1 | 8/2014 | Lynes et al. | |
| 2015/0067072 A1* | 3/2015 | Yin ......................... | H04L 51/30 709/206 |

OTHER PUBLICATIONS

"Windows Push Notification Services (WNS) overview (Windows Runtime apps)", Published on: Dec. 31, 2012 Available at: http://msdn.microsoft.com/en-in/library/windows/apps/hh913756.aspx.

(Continued)

*Primary Examiner* — Ghazal Shehni
(74) *Attorney, Agent, or Firm* — Ben Tabor; Doug Barker; Micky Minhas (57) ABSTRACT

Embodiments are directed to registering a device to receive notifications. In one scenario, a computer system receives a notification registration request from a computing device. The computer system generates a registration secret which includes identification information that uniquely identifies the computing device, and sends the generated registration secret including the information that uniquely identifies the computing device to a notification service. The computer system receives a hash value from the computing device, where the hash value is generated based on the identification information of the generated registration secret. The computer system computes another hash value based on the identification information of the received registration secret to determine whether the second hash value matches the first hash value, and upon determining that the second hash value matches the first hash value, the computer system registers the computing device to receive notifications from the notification service.

20 Claims, 4 Drawing Sheets

(56) References Cited

OTHER PUBLICATIONS

"Orchestrating iOS Push Notifications on Google Cloud Platform", Retrieved on: May 29, 2014 Available at: https://cloud.google.com/developers/articles/ios-push-notifications.

"Apple Push Notification Service", Published: Apr. 30, 2013 Available at: https://developer.apple.com/library/ios/documentation/NetworkingInternet/Conceptual/RemoteNotificationsPG/Chapters/ApplePushService.html.

"Notification Hubs Overview", Published on: Sep. 6, 2013 Available at: http://msdn.microsoft.com/en-us/library/jj927170.aspx.

Deng, Nan, "Uniqush", Published on: Nov. 7, 2013 Available at: http://uniqush.org/.

"Why use Push IOfor APNS Push Notifications?", Retrieved on: Jun. 2, 2014 Available at: http://push.io/apns/.

Menezes, et al., "Handbook of Applied Cryptography", CRC Press LLC, 1997, 64 pages. (The month of Publication is irrelevant since the year of Publication is clearly prior to the filing of the Application).

International Search Report & Written Opinion Issued in PCT Application No. PCT/US2015/046620, Mailed Date: Nov. 4, 2015, 11 Pages.

Second Written Opinion Issued in PCT Application No. PCT/US2015/046620, Mailed Date: Mar. 22, 2016, 6 Pages.

International Preliminary Report on Patentability Issued in PCT Application No. PCT/US2015/046620, Mailed Date: Jun. 29, 2016, 7 Pages.

* cited by examiner

DEVICE VERIFICATION PRIOR TO REGISTRATION

BACKGROUND

Computing systems have become ubiquitous, ranging from small embedded devices to phones and tablets to PCs and backend servers. Each of these computing systems is designed to process software code. The software allows users to perform functions such as registering for notifications. When using cellular phones or other portable electronic devices, users may desire to register their devices to receive push notifications from certain applications or services. Users typically request registration for their device and receive a code such as a sequence of numbers or letters via email or text message. The user then enters this code in the application to prove that they are the owner of the phone and that they are indeed requesting registration for push notifications.

BRIEF SUMMARY

Embodiments described herein are directed to registering a device to receive notifications. In one embodiment, a computer system receives a notification registration request from a computing device. The computer system generates a registration secret which includes identification information that uniquely identifies the computing device, and sends the generated registration secret including the information that uniquely identifies the computing device to a notification service. The computer system receives a first hash value from the computing device, where the first hash value is generated based on the identification information of the generated registration secret. The computer system computes a second hash value based on the identification information of the received registration secret to determine whether the second hash value matches the first hash value, and upon determining that the second hash value matches the first hash value, the computer system registers the computing device to receive notifications from the notification service.

In another embodiment, a computer system performs an alternative method for registering a device to receive notifications. The computer system generates a client challenge that is identifiable as originating at the computing device and sends a notification registration request including the generated client challenge to a registration service. The computer system receives, from a notification service, a registration secret which includes information that uniquely identifies the computing device including the client challenge and verifies that the received client challenge matches the generated client challenge. The computer system then sends the registration request including the registration secret to the registration service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to registering a device to receive notifications. In one embodiment, a computer system receives a notification registration request from a computing device. The computer system generates a registration secret which includes identification information that uniquely identifies the computing device, and sends the generated registration secret including the information that uniquely identifies the computing device to a notification service. The computer system receives a first hash value from the computing device, where the first hash value is generated based on the identification information of the generated registration secret. The computer system computes a second hash value based on the identification information of the received registration secret to determine whether the second hash value matches the first hash value, and upon determining that the second hash value matches the first hash value, the computer system registers the computing device to receive notifications from the notification service.

In another embodiment, a computer system performs an alternative method for registering a device to receive notifications. The computer system generates a client challenge that is identifiable as originating at the computing device and sends a notification registration request including the generated client challenge to a registration service. The computer system receives, from a notification service, a registration secret which includes information that uniquely identifies the computing device including the client challenge and verifies that the received client challenge matches the generated client challenge. The computer system then sends the registration request including the registration secret to the registration service.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
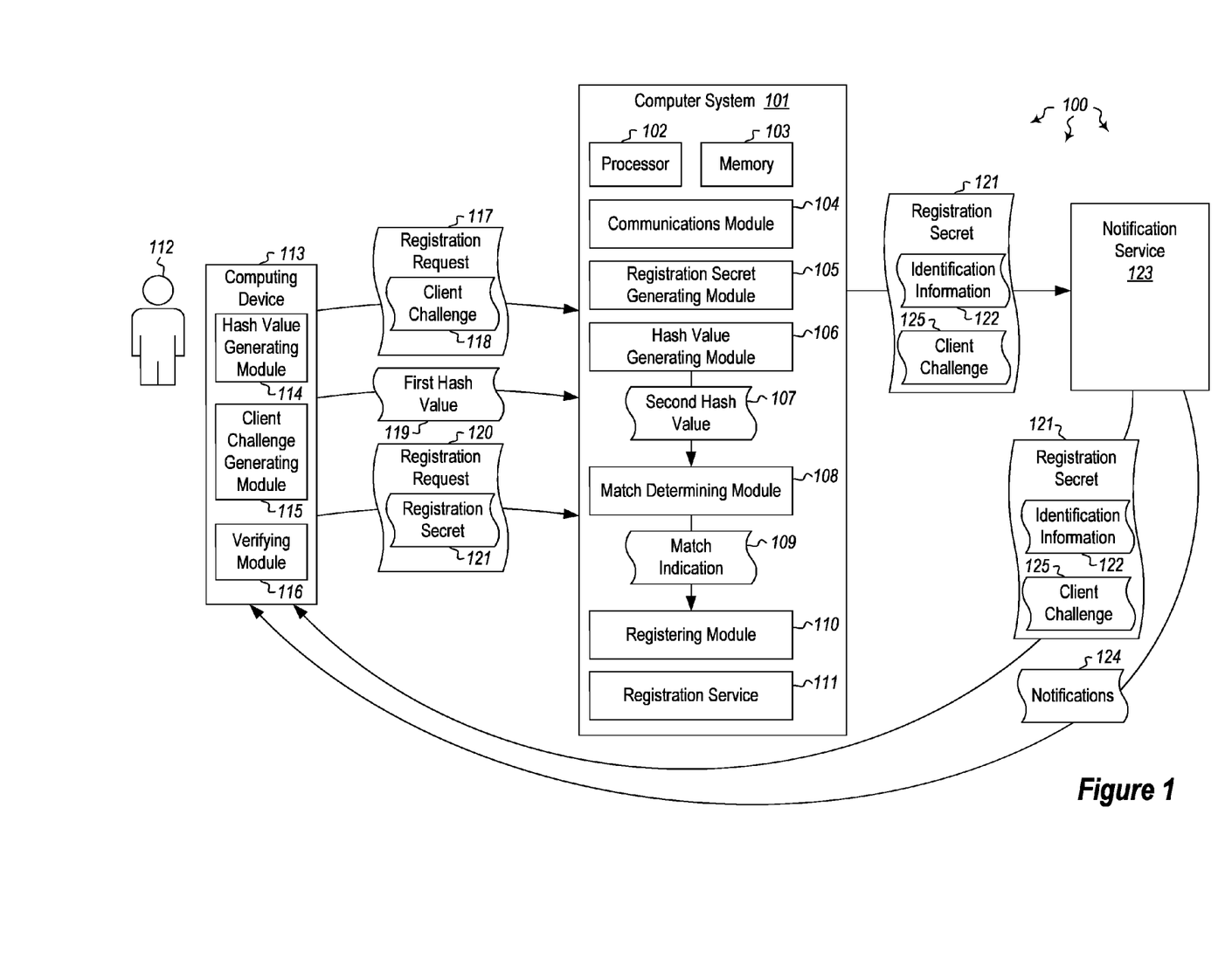
FIG. 1 illustrates a computer architecture in which embodiments described herein may operate including registering a device to receive notifications.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system 101 includes modules for performing a variety of different functions. For instance, the communications module 104 may be configured to communicate with other computing systems. The communications module 104 may include any wired or wireless communication means that can receive and/or transmit data to or from other computing systems. The communications module 104 may be configured to interact with databases, mobile computing devices (such as mobile phones or tablets), embedded or other types of computing systems.

In some cases, users or devices may need or want to subscribe to receive notifications or other types of messages. For instance, a user may want for a certain application to receive push notifications (such as an email application or a social media application). In other cases, a wearable device or an appliance may be subscribed to receive updates or other messages. Thus, it should be understood that the embodiments described herein include substantially any type of stationary or mobile electronic device, large or small, embedded devices, standalone, distributed or other types of computing systems. These devices, whether controlled by a user or by another device or a software program, may want to sign up to receive certain types of messages, including push notifications. Accordingly, while push notifications will be discussed at length herein, it will be understood that substantially any type of messages or notifications are contemplated herein. In previous situations, when a user wanted to sign up to receive push notifications, the user's phone would receive a code (typically via email or SMS) and the user would manually enter the code to confirm that they requested the push notifications and that they are the owner of the phone. Asking users to enter this code reduced the number of malicious or accidental requests.

Embodiments described herein allow users or devices to sign up to receive push notifications without receiving and manually re-entering codes. Registration for push notifications can occur securely behind the scenes, without the user even knowing that it is occurring. Embodiments described herein provide security mechanisms that ensure that the device requesting to sign up for notifications is indeed the user's device and is indeed requesting push notifications. The device's registration occurs without the user's knowledge, and involves a registration service 111 (as shown in FIG. 1) and a notification service. The notification service 123 is what actually sends out the push notifications or other messages. The notification service may be a third party notification service, or may be provided in-house. The registration service 111 may be hosted on a single computing system or on the cloud. Indeed, it should be noted that each of the computing systems shown in FIG. 1 (i.e. computer system 101 and computing device 113) may be any type of computing system, including local or distributed computing systems, stationary or mobile computing systems, embedded devices or programmable logic devices.

The computer system 101 include modules which perform various functionality. These modules may be located on the same computing system or on many different computing systems (or on different processing cores). The computer system 101 may, for instance, include a registration secret generating module 105. The registration secret generating module 105 may be configured to generate registration secrets in response to receiving registration requests (e.g. 117). As the term is used herein, a "registration secret" refers to any portion of information that can be used to uniquely identify the computer system 101, or is uniquely identifiable as originating from the computer system 101 or the registration service 111. Thus, a registration secret may be a hash value, or an identifier (such as a globally unique identifier (GUID)). The registration secret 121 may include identification information 122 (such as a phone number or a randomly generated string) that is unique to computing device 113. This identification information may be any string of numbers, letters or other characters that identifies the computing device 113. The registration secret thus includes some portion of information that can be used to identify the computing device 113. In some embodiments, the registration secret 121 may also include a client challenge 125.

A "client challenge", as used herein, is similar to a registration secret in that it includes information that uniquely identifies the client device (e.g. computing device 113). The client challenge 118 is generated at the client device and may be the same as or different than the client challenge 125 that is ultimately sent to the notification service 123. For instance, the client challenge 118 sent from the client device may be in unencrypted form, while the client challenge included in the registration secret 121 may be encrypted. The opposite case may also be implemented where the client challenge 118 sent from the client device 113 is in unencrypted form, and the client challenge 125 included in the registration secret 121 is encrypted.

The notification service 123 may send the registration secret 121 to the client computing device 113. The registration secret may include identification information 122 (such as the client device's phone number) and a client challenge such as a GUID that is only known to the client device. The verifying module 116 of the client device 113 may then verify that it was the one that sent the original registration request 117. Upon verifying that the computing device 113 was the original sender of the request 117, the hash generating module 114 of the client device 113 may generate a hash value 119. The match determining module 108 of computer system 101 compares the hash value 119 to a second hash value 107 generated by computing system 101. If there is a match between hash values, an indication 109 is sent to the registering module 110 and the client device 113 is registered to receive notifications. Thereafter, notifications 124 may be sent by the notification service 123 to the client device 113. This process will be explained further below with regard to methods 200 and 300 of FIGS. 2 and 3, respectively.

Figure 2:
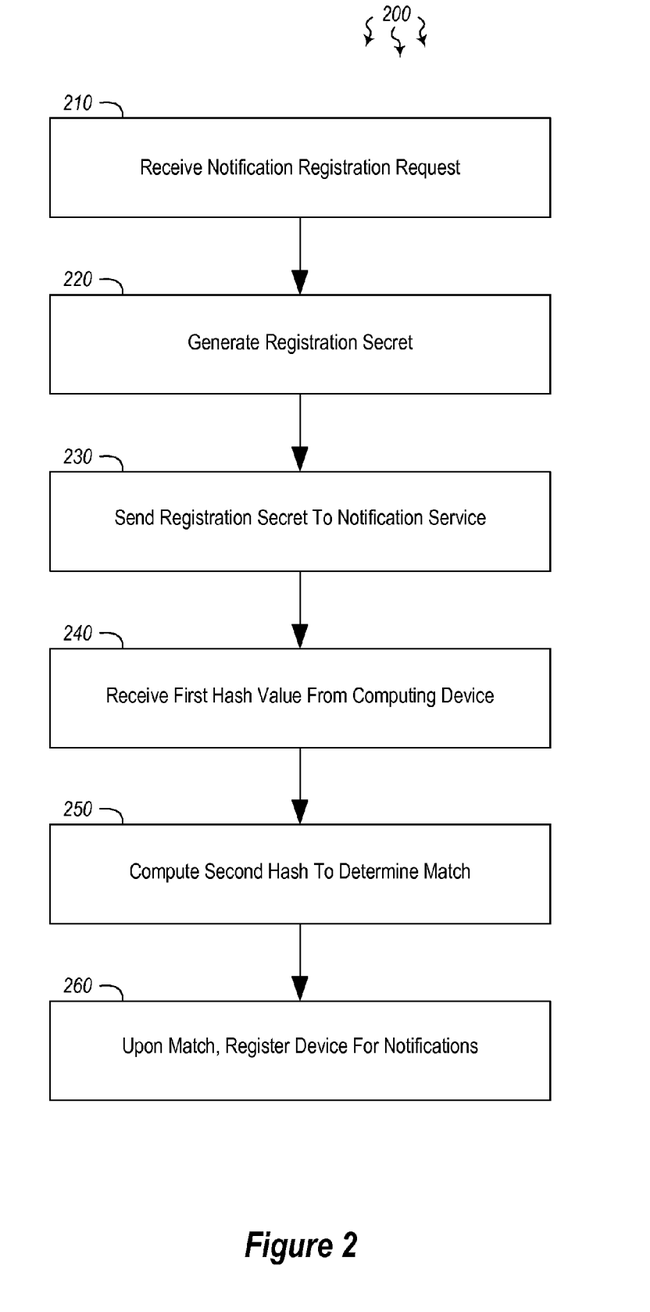
FIG. 2 illustrates a flowchart of an example method for registering a device to receive notifications.
Figure 3:
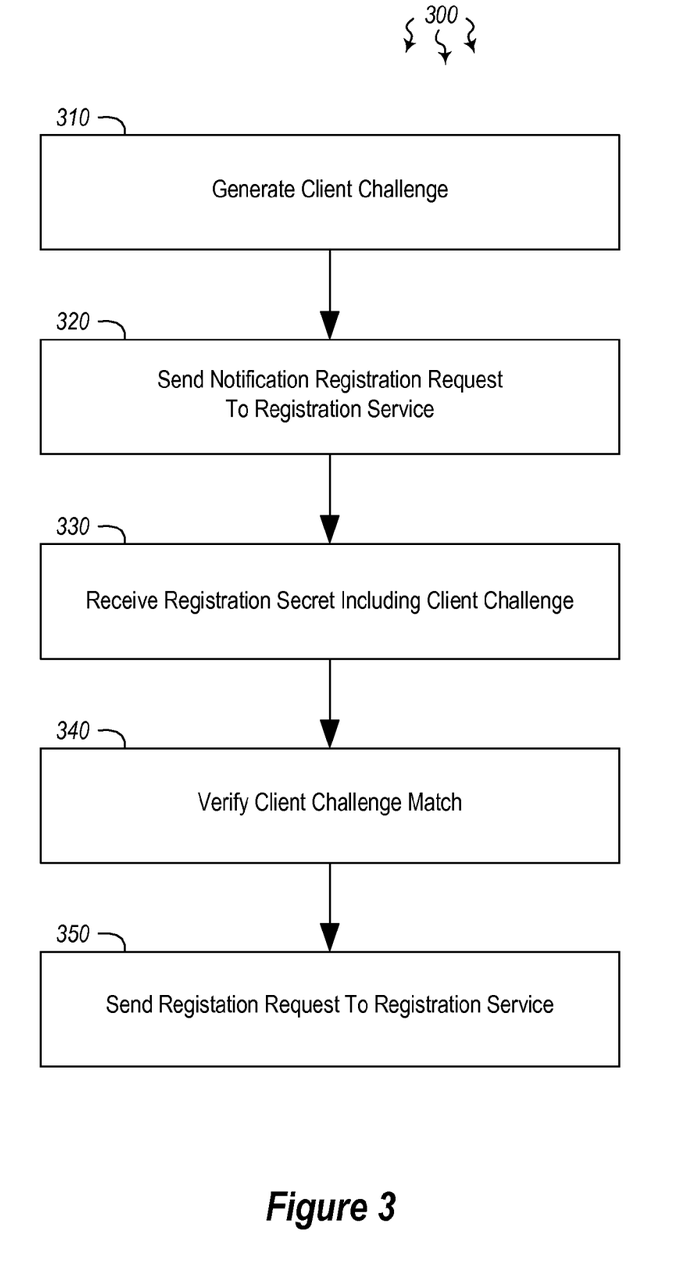
FIG. 3 illustrates a flowchart of an alternative example method for registering a device to receive notifications.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for registering a device to receive notifications. The method 200 will now be described with frequent reference to the components and data of environment 100.

Method 200 includes an act of receiving a notification registration request from a computing device (act 210). The communications module 104 of computer system 101 may receive notification registration request 117 from computing device 113. As mentioned above, the computing device 113 may belong to user 112 and may be a mobile device such as a smart phone, tablet or wearable device. Alternatively, the computing device 113 may be a stationary or distributed device. The registration request 117 may be a request from an application, service, operating system or other portion of code running on the computing device. The registration request 117 may request that the device 113 be registered to receive notifications. Once registered, the device will then be subscribed to receive one or more types of notifications 124 from the notification service 123. In some cases, these notifications are push notifications sent to subscribers of that push notification. Applications or services on the user's device 113 then notify the user that a push notification has been received. In some cases, the computer system 101 logically places the computing device 113 in an untrusted state, such that the device is not registered until the registration process is complete and the device request is identified as being legitimate.

Method 200 further includes an act of generating a registration secret which includes identification information that uniquely identifies the computing device (act 220). For example, the registration secret generating module 105 may generate registration secret 121. The registration secret 121 may include information 122 identifying the computing device 113 such as a phone number or GUID. In some embodiments, the identification information 122 uniquely identifying the computing device 113 comprises a push notification channel identifier or "push address" which is the address a device uses to receive push notifications. In some cases, the identification information 122 in the registration secret 121 includes a client challenge 125 received from the computing device. The client challenge may be the same as the client challenge 118 received with the registration request 117, or may be a modified (e.g. encrypted) version. The identification information 122 may further include a notification address associated with the computing device and a timestamp.

The hash value generating module 106 of computer system 101 may access this identification information 122 and create a hash based thereon. Thus, in such cases, the registration secret 121 may include a hash of the client challenge, the notification address and the timestamp. In some cases, the client challenge 125 may be sent in unencrypted form in addition to the hash of the client challenge, notification address and timestamp. The generated registration secret, the timestamp and the received client challenge are thus sent to the notification service 123. The registration secret 121, the identification information 122 and/or the client challenge 125 may be sent by the notification service 123 to the client computing device 113, where the client computing device can verify that it was the device that issued the client challenge.

Returning to FIG. 2, method 200 includes an act of sending the generated registration secret including the information that uniquely identifies the computing device to a notification service (act 230), and receiving a first hash value from the computing device, the first hash value being generated based on the identification information of the generated registration secret (act 240). The hash value generating module 114 of computing device 113 may generate the first hash value 119 which may be sent by itself or along with the registration request 117. The first hash value 119 may be generated by hashing one or more portions of information including, but not limited to, the identification information 122 received as part of the registration secret 121, the client challenge 125 or based on some other information. In one embodiment, the first hash value 119 is a hash of a phone number associated with the computing device 113.

The hash value generating module 106 of computer system 101 computes a second hash value 107 based on the identification information of the received registration secret to determine whether the second hash value matches the first hash value (act 250). Thus, the hashing module of the computer system 101 hashes the same information (or what should be the same information if the computing device is the true originator of the registration request) to achieve the second hash value 107. The match determining module 108 determines whether the two hash values (119 and 107) match and, upon determining that they do match, the registering module 110 of computer system may register the computing device 113 to receive notifications 124 from the notification service 123 (act 260). As the hash created by the computing device 113 is based on the same identification information 122 used by computer system 101 to generate its hash, the resulting hash values should match. If they do not match, it is an indication that computing device 113 was not the device that issued the original registration request 117, as the identification information 122 is unique to the issuer of the request.

In some embodiments, the registration secret 121 is sent to the notification service, to the client device 113 and then back to the computer system 101. The registration secret 121 sent back to the computer system 101 may be encrypted. In such cases, the second hash value 107 may be generated based on the encrypted received registration secret. Accordingly, if may not be necessary to decrypt the encrypted registration secret; rather, the second hash value may be generated and compared to the first hash value. If a match exists, the registration request was legitimate. Once the registration request is determined to be legitimate, the registration service 110 registers the computing device 113 to receive push notifications. The registration service may be hosted on the cloud and may provide registration services to a plurality of different users/devices simultaneously. The registration service itself may be used to generate the registration secret 121, and may send the registration secret, identification information and the timestamp to the notification service. These may be encrypted using a key that is unique to the registration service and/or to the computer system 101. Thus, in this manner, a computing device 113 may be automatically registered to receive notifications, without any interaction from the user after initiating the original registration request 117.

Turning now to FIG. 3, a flowchart is illustrated of a method 300 for registering a device to receive notifications. The method 300 will now be described with frequent reference to the components and data of environment 100.

Method 300 includes an act of generating a client challenge that is identifiable as originating at the computing device (act 310). For example, the client challenge generating module 115 of computing device 113 may generate client challenge 118. The client challenge is an identifier, string, hash value, file, quick response (QR) code, or even a randomly generated number—it is anything that can be identified as coming from the computing device 113. This client challenge may be generated after having sent a registration request to a notification service 123, and having received from the notification service a notification address that uniquely identifies the computing device. The notification address may be any identifier or address at which the computing device is configured to receive notifications. This notification address, however, may be different for different platforms and operating systems.

Thus, phones manufactured or provided by one company may have different notification addresses than those provided by a different company. Each of these companies may also provide their own notification services, or may use third party notification services. Accordingly, one platform or operating system running on computing device 113 may be registered to receive notifications from one notification service, while a different platform or operating system running on a different computing device may be registered to receive notifications from a different notification service.

Returning to FIG. 3, method 300 includes an act of sending a notification registration request including the generated client challenge to a registration service (act 320). As shown in FIG. 1, computing device 113 may send registration request 117 along with client challenge 118 to computer system 101. The client challenge, as mentioned above, includes information that is identifiable as coming from the computing device. For example, the client challenge 118 can be hash of a timestamp and the notification address, or can be any other unique number. Method 300 also includes acts of receiving, from a notification service, a registration secret which includes identification information that uniquely identifies the computing device including the client challenge (act 330), verifying that the received client challenge matches the generated client challenge (act 340), and sending the registration request including the registration secret to the registration service (act 350).

Accordingly, the computing device 113 may receive, from notification service 123, registration secret 121 which includes identification information 122 that uniquely identifies the computing device. The registration secret 121 may also include the client challenge 125, which may be the same (unaltered) client challenge 118 initially sent with the registration request 117. The verifying module 116 of computing device 113 verifies that the client challenge 125 matches the generated client challenge 118. Upon determining that the client challenges match, the registration request 120 is sent to the computer system 101 (i.e. to the registration service 111 hosted thereon) along with the registration secret generated by the computer system 101. In this manner, a verification occurs on the client device 113, ensuring that the client challenges match, and a verification occurs on the registration service side, ensuring that hash values 119 and 107 match. Using these verifications, the system can ensure, without intervention or input from user 112, that computing device 113 was indeed the device that issued the original registration request 117.

Once the registration service 111 has registered the computing device 113 to receive notifications from notification service 123, the registration service may send an indication to the computing device 113 indicating that the computing device has been registered to receive notifications from the notification service. From this point on, the computing device 113 may receive notifications from the notification service.

Figure 4:
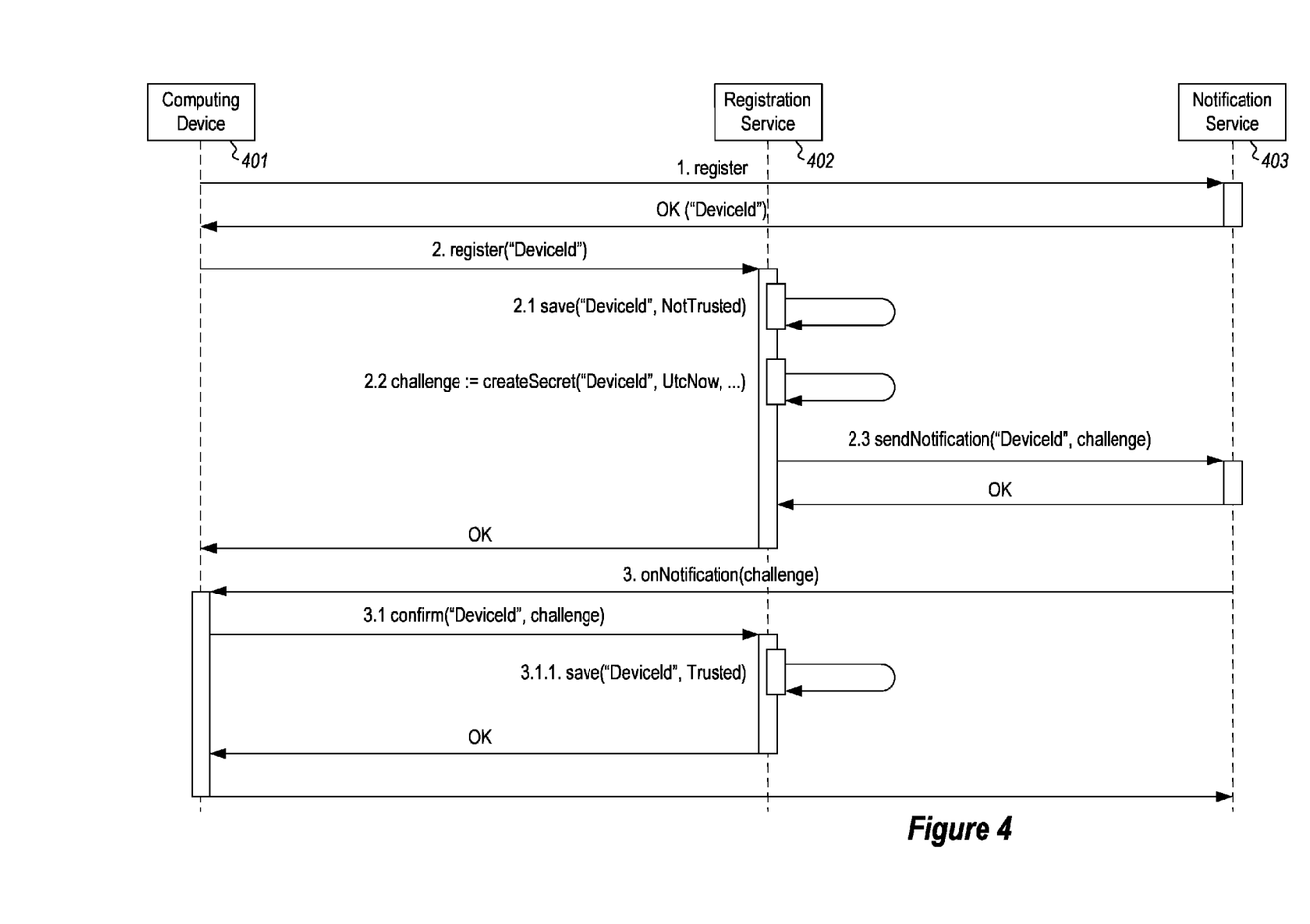
FIG. 4 illustrates an embodiment in which a device registers for push notifications without user interaction.

FIG. 4 illustrates an embodiment that involves the various parties and computing systems shown in FIG. 1. FIG. 4 includes a computing device 401 which may be similar to or the same as computing device 113 from FIG. 1. FIG. 4 also includes registration service 402 which may be similar to or the same as registration service 111 of computer system 101. Still further, FIG. 4 includes a notification service 403 which may be similar to or the same as notification service 123. The computing device 401 may thus send (at Step 1) a request for a notification address at which the device can receive push notifications. The notification service 403 may respond with an OK and a device identifier or notification address.

At Step 2, the computing device 401 may send a registration request (similar to 117 of FIG. 1) to the registration service 402. The registration service 402 may save the device's notification address (and/or other information), and may tag or otherwise indicate the computing device 401 as being untrusted at Step 2.1. In Step 2.2, the registration service 402 may create a registration secret (e.g. 121 of FIG. 1) that includes identification information 122 such as the notification address or other identifiers. The registration service 402 then sends the registration secret to the notification service 403 at Step 2.3. The notification service 403 replies with an acknowledgement and sends the registration secret and accompanying information on to the computing device 401. The computing device 401 receives the registration secret including the client challenge at Step 3. The computing device 401 verifies the client challenge at Step 3.1 and sends the registration secret along with a registration request to the registration service 402. The registration service 402 then registers the computing device 401 to receive notifications using the identification information (e.g. the notification address) at Step 3.1.1, and provides an indication to the computing device that it has been successfully registered to receive notifications from notification service 403. Thus, in this manner, a device may be registered to receive notifications without interaction from a user.

Accordingly, methods, systems and computer program products are provided which register a device to receive notifications.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. At a computer system including at least one processor, a computer-implemented method for registering a device to receive notifications, the method comprising:
   receiving a notification registration request from a computing device;
   generating a registration secret which includes identification information that uniquely identifies the computing device;
   sending the generated registration secret including the identification information that uniquely identifies the computing device to a notification service to be forwarded to the computing device;
   receiving a first hash value from the computing device, the first hash value being generated by the computing device and being generated based on the identification information of the generated registration secret;
   computing a second hash value based on the identification information of the received registration secret;
   comparing the first and second hash values and determining whether the second hash value matches the first hash value; and
   when it has been determined that the second hash value matches the first hash value, registering the computing device to receive notifications from the notification service.

2. The method of claim 1, wherein the identification information in the registration secret includes a client challenge received from the computing device, a notification address associated with the computing device and a timestamp.

3. The method of claim 2, wherein the registration secret comprises a hash of the client challenge, the notification address and the timestamp.

4. The method of claim 2, wherein the generated registration secret, the timestamp and the received client challenge are sent to the notification service.

5. The method of claim 2, wherein the client challenge is generated by the computer system.

6. The method of claim 2, wherein the client challenge is included as part of the first hash value.

7. The method of claim 6, wherein the identification information uniquely identifying the computing device comprises a push notification channel identifier.

8. The method of claim 1, wherein the notification registration request requests that the computing device be registered to receive push notifications.

9. The method of claim 1, wherein the identification information uniquely identifying the computing device comprises a globally unique identifier (GUID) taken associated with at least one hardware or software component of the computing device.

10. The method of claim 1, wherein the received registration secret is encrypted, and wherein the second hash value is generated based on the encrypted received registration secret.

11. The method of claim 1, wherein upon receiving the notification registration from the computing device, the computing device is logically placed in an untrusted state.

12. At a computing device including at least one processor, a computer-implemented method for the computing device to register to receive notifications, the method comprising:
   generating a client challenge that is identifiable as originating at the computing device;
   sending a notification registration request including the generated client challenge to a registration service;
   receiving, from a notification service, a registration secret which includes identification information that uniquely identifies the computing device including the client challenge;
   determining whether the received client challenge received from the notification service matches the generated client challenge previously sent to the registration service; and
   upon determining that the client challenge received from the notification service matches the generated client challenge previously sent to the registration service, sending a second registration request including the registration secret to the registration service.

13. The method of claim 12, further comprising:
   receiving, from the notification service, a notification address that uniquely identifies the computing device, the notification address comprising an address at which the computing device is configured to receive notifications.

14. The method of claim 13, wherein the notification address is different for each of a plurality of different platforms.

15. The method of claim 12, wherein the notification service comprises a third party notification service associated with at least one application or operating system running on the computing device.

16. The method of claim 12, wherein the client challenge comprises a portion of information that is identifiable as coming from the computing device.

17. The method of claim 12, further comprising receiving an indication that the computing device has been registered to receive notifications from the notification service.

18. A computer system comprising the following:
   one or more processors;
   one or more computer-readable storage media having stored thereon computer-executable instructions that, when executed by the one or more processors, cause the computing system to perform a method for registering a device to receive notifications, the method comprising the following:
   receiving a push notification registration request from a computing device, the request including a push notification address associated with the computing device and a client challenge;
   generating a registration secret including the received client challenge, the push notification address and a timestamp;
   sending the generated registration secret, the timestamp and the client challenge to a push notification service to be forwarded to the computing device;
   receiving a first hash value from the computing device, the first hash value being generated by the computing device and representing the generated registration secret, the timestamp and the client challenge;
   computing a second hash value of the received registration secret, the timestamp and the client challenge;
   comparing the first and second hash values and determining whether the second hash value matches the first hash value; and upon determining that the second hash value matches the first hash value, registering the computing device to receive push notifications.

19. The computer system of claim 18, wherein the computer system is registered to receive push notifications at a registration service running on the computer system.

20. The computer system of claim 19, wherein the registration secret and the timestamp sent to the push notification service are encrypted using a key that is unique to the registration service.

* * * * *